Nov. 6, 1962  E. L. McCARTHY  3,062,101
ANASTIGMATIC CATOPTRIC SYSTEMS
Filed May 29, 1959
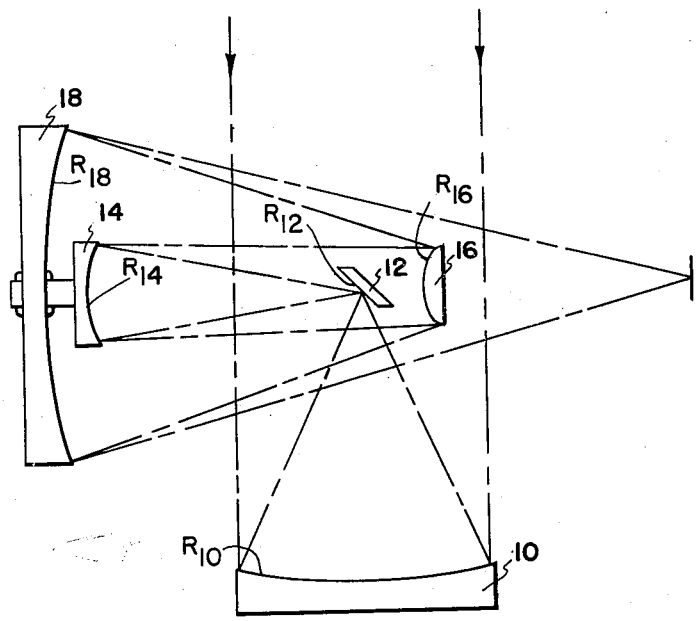
EDWARD L. MCCARTHY
*INVENTOR.*
BY

United States Patent Office 3,062,101
Patented Nov. 6, 1962

3,062,101
ANASTIGMATIC CATOPTRIC SYSTEMS
Edward L. McCarthy, Darien, Conn., assignor to The Perkin-Elmer Corporation, Norwalk, Conn., a corporation of New York
Filed May 29, 1959, Ser. No. 816,817
3 Claims. (Cl. 88—57)

This invention relates to catoptric systems for the production of optical images which may be recorded or examined by photographic means, by visual means, or by other techniques. Primary objects of the present invention are to provide such a system which is optically fast and is well corrected for both axial and field aberrations.

The above objects are attained by providing a catoptric system comprising a first concave paraboloidal reflector means positioned to receive and focus radiant energy from a distant object, a second concave paraboloidal reflector means positioned to receive and collimate the energy from the first reflector, a convex reflector means positioned to receive and reflect the collimated energy, and a concave reflector means positioned to focus the energy from the convex reflector.

The manner in which the above objects are attained will be more apparent from the following description, the appended claims, and the single FIGURE of the attached drawing which is a schematic illustration of a system of the type disclosed and claimed herein. Since this invention is completely free from chromatic aberration, it is equally useful in forming images by focusing radiation in the ultraviolet, visible, and infrared spectral regions.

As indicated by the drawing, radiation from a relatively distant source is focused by the paraboloidal reflector 10 toward the plane mirror 12 which is positioned at a distance from mirror 10 equal to the focal length of mirror 10. Since the second paraboloidal reflector 14 is positioned at a distance equal to its own focal length from plane mirror 12, it will be seen that mirrors 10 and 14 comprise a telescopic system of two paraboloids. Such a system has no third-order aberrations except Petzval curvature and distortion. If now the entrance pupil is made to lie a little in advance of mirror 10, the exit pupil of the telescopic system will fall a little beyond plane mirror 12, and a convex spherical mirror 16 is positioned at this pupil. A concave spherical mirror 18 is positioned to reflect and focus radiation from mirror 16. It is known in the art that if the radii of curvature of spherical mirror 16 and spherical mirror 18 bear the ratio of $$\frac{\sqrt{5}-1}{\sqrt{5}+1}$$

and furthermore are positioned with a common center of curvature, then collimated light impinging on mirror 16 will be reflected to mirror 18 and focused by mirror 18 to an image which is free of all third order aberrations except Petzval curvature and distortion. The magnitude of the Petzval curvature depends upon the scale of the system and in the present invention the scale is chosen to make the absolute value of the Petzval curvature of the system comprising mirrors 16 and 18 equal to the Petzval curvature of the sysem comprising mirrors 10 and 14. Since the algebraic signs of the two curvatures are opposite, the complete system comprising mirrors 10, 14, 16, and 18 has zero Petzval curvature and, therefore, no third order aberrations except distortion. In practice, it is desirable to depart somewhat from the condition of zero third order so that higher order aberrations may be partly balanced. The adjustment may be in the nature of a departure from the concentricity of mirrors 16 and 18, or from their $$\frac{\sqrt{5}-1}{\sqrt{5}+1}$$

ratio, or by slight aspheric deformations of one or more of the mirrors 10, 14, 16, 18. Such adjustment is familiar to those skilled in the art of optical design.

Since the intermediate image occurs at plane reflector 12, the size of this mirror determines the angular field of view for the system. Mirror 12 may be constructed in the form of a circular disk, in which case it must be somewhat limited in size on account of unwanted obscuration of the radiation passing between elements 14 and 16. If, however, the desired field is rectangular with a width considerably less than its length as, for example, in a strip camera, mirror 12 may be narrow with a considerable length in a direction perpendicular to the plane of the figure.

As an example of the present invention, a catoptric system similar to that of the drawing was constructed utilizing a round plane mirror 12. In order to prevent undue obscuration, the mirror was limited in size so that a field of 9° was obtained. The geometrical speed was $f/1$. Constructional data for a system free of all third order aberrations except distortion and of equivalent focal length 100 follow:

| Vertex radii: | Separations: |
|---|---|
| $R_{10}=278.4$ | $S_1=139.2$ |
| $R_{12}=\infty$ | $S_2=54.6$ |
| $R_{14}=109.1$ | $S_3=66.3$ |
| $R_{16}=48.5$ | $S_4=78.6$ |
| $R_{18}=127.0$ | $BFL=166.2$ |

I claim:

1. A catoptric system which comprises first concave paraboloidal reflector means positioned to receive and focus radiant energy; plane reflector means positioned to reflect the energy from said first reflector means; second concave paraboloidal reflector means positioned to receive and collimate the energy from said plane reflector means; convex spherical reflector means positioned to receive and reflect the collimated energy from said second paraboloidal reflector means; and concave spherical reflector means positioned to reflect and focus the energy from said convex reflector means, said convex and concave spherical reflector means having a common center of curvature, the radius of curvature of the convex spherical reflector means substantially bearing to the radius of curvature of the concave spherical reflector means the ratio of $$\frac{\sqrt{5}-1}{\sqrt{5}+1}$$

2. A catoptric system which comprises first concave paraboloidal reflector means positioned to receive and focus radiant energy; plane reflector means positioned to reflect the energy from said first reflector means; second concave paraboloidal reflector means positioned to receive and collimate the energy from said plane reflector means; convex spherical reflector means positioned to receive and reflect the collimated energy from said second paraboloidal reflector means; and concave spherical reflector means positioned to reflect and focus the energy from said convex reflector means, wherein said convex and concave spherical reflector means have a substantially common center of curvature, wherein said second concave paraboloidal reflector means, convex spherical reflector means, and concave spherical reflector means are positioned along a common geometric axis, and wherein the algebraic sum of the Petzval curvatures of said first and second concave paraboloidal reflector means, convex reflector means, and concave spherical reflector means is substantially equal to zero.

3. A catoptric system which comprises first concave paraboloidal reflector means positioned to receive and focus radiant energy; second concave paraboloidal reflector means positioned to receive and collimate the energy from said first reflector means; convex spherical reflector means positioned to receive and reflect the collimated energy from said second paraboloidal reflector means; and concave spherical reflector means positioned to reflect and focus the energy from said convex reflector means, wherein said convex and concave spherical reflector means have a substantially common center of curvature, wherein said second concave paraboloidal reflector means, convex spherical reflector means, and concave spherical reflector means are positioned along a common geometric axis, and wherein the algebraic sum of the Petzval curvatures of said first and second concave paraboloidal reflector means, convex reflector means, and concave spherical reflector means is substantially equal to zero.

References Cited in the file of this patent
UNITED STATES PATENTS

| | | |
|---|---|---|
| 1,552,451 | Roach | Sept. 8, 1925 |
| 2,166,102 | Wild | July 18, 1939 |
| 2,636,415 | Zobel | Apr. 28, 1953 |
| 2,924,142 | Nomarski | Feb. 9, 1960 |